United States Patent
Yamaguchi et al.

(10) Patent No.: US 7,469,947 B2
(45) Date of Patent: Dec. 30, 2008

(54) INSTRUMENT PANEL OF MOTORCYCLE

(75) Inventors: Seiji Yamaguchi, Wako (JP); Yoshihiro Takanashi, Wako (JP); Kenta Nakamura, Wako (JP); Masaru Nakayama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 213 days.

(21) Appl. No.: 11/236,865

(22) Filed: Sep. 28, 2005

(65) Prior Publication Data
US 2006/0072331 A1 Apr. 6, 2006

(30) Foreign Application Priority Data
Sep. 30, 2004 (JP) ............................ 2004-288831

(51) Int. Cl.
*B60R 13/00* (2006.01)
(52) U.S. Cl. .................... 296/24.34; 296/70; 180/90
(58) Field of Classification Search ............. 296/24.34, 296/70; 180/90; 280/752; 220/562–564
See application file for complete search history.

(56) References Cited

U.S. PATENT DOCUMENTS

| 6,407,663 B1 * | 6/2002 | Huggett ...................... 340/461 |
| 2001/0028176 A1 * | 10/2001 | Suzuki et al. ................. 296/70 |
| 2007/0075087 A1 * | 4/2007 | Knight ....................... 220/562 |

FOREIGN PATENT DOCUMENTS

| JP | 2000128052 A | * | 5/2000 |
| JP | 2001-114170 | | 4/2001 |

OTHER PUBLICATIONS

Machine translation of JP 2001-114170.*

* cited by examiner

*Primary Examiner*—Jason S Morrow
(74) *Attorney, Agent, or Firm*—Westerman, Hattori, Daniels & Adrian, LLP.

(57) ABSTRACT

An instrument panel of a motorcycle is provided that includes a vehicle-use meter located on an upper portion of a fuel tank and covered by a meter cover. A manipulation switch, with communicates with the vehicle-use meter, is attached with a side surface of the meter cover.

5 Claims, 11 Drawing Sheets

INSTRUMENT PANEL OF MOTORCYCLE

FIELD OF THE INVENTION

The present invention relates to an instrument panel of a motorcycle which can display vehicle information such as a speed display, an engine rotational speed display and an integrated distance display.

BACKGROUND OF THE INVENTION

In a conventional instrument panel, a vehicle-use meter, which displays the vehicle information, is arranged around a handle or a front-cowl. It is sufficient for an instrument panel to be mounted within a driver's visible range and the vehicle information to be displayed on the vehicle-use meter.

A motorcycle instrument panel of a motorcycle has been proposed which arranges the vehicle-use meter on an upper portion of a fuel tank, as taught in JP-A-2001-114170.

The conventional motorcycle instrument panel is configured as follows. A vehicle-use meter is mounted on an upper portion of a fuel tank. The instrument panel is covered with a meter cover wherein the vehicle-use meter can be viewed through the meter cover. A reset switch for resetting the meter to an initial state and a mode switch for setting meter modes are mounted on an upper surface of the vehicle-use meter. The reset switch and the mode switch are allowed to project from the meter cover so as to enable the manipulation of the reset switch and the mode switch from the upper surface of the meter cover.

However, in the conventional motorcycle instrument panel, manipulation switches (e.g., reset switch and mode switch) are arranged on the upper surface of the meter cover and hence, there has been a drawback that the surface of the vehicle-use meter cover cannot be increased or the meter cover per se becomes large-sized. Another problem with the conventional instrument panel is that a driver can carelessly touch these manipulation switches.

Further, in the conventional motorcycle instrument panel, the vehicle-use meter is covered with the meter cover whereby the vehicle-use meter can be viewed through the meter cover and hence, there has been a problem that the vehicle-use meter is embedded in a portion arranged inwardly (in the depth direction) from the meter cover.

Accordingly, there has been a demand for an instrument panel of a motorcycle which can reduce the likelihood of a rider from carelessly touching the manipulation switches and, at the same time, which can arrange the vehicle-use meter in an easily visible state.

SUMMARY OF THE INVENTION

It is an object of the present invention to provide an instrument panel of a motorcycle which can prevent a rider from carelessly touching manipulation switches. It is another object of the present invention to provide an instrument panel of a motorcycle which can enhance the visibility of a vehicle-use meter by overcoming a drawback that it is difficult for a rider to observe the vehicle-use meter.

According to one embodiment of the present invention, a vehicle-use meter is arranged on an upper portion of a fuel tank of a motorcycle. The surrounding of the vehicle-use meter is covered with a meter cover and a manipulation switch which manipulates the vehicle-use meter is located on a side surface of the meter cover. Accordingly, it is possible to prevent or reduce the likelihood of a rider from carelessly touching or manipulating the manipulation switch.

According to another embodiment of the present invention, the manipulation switch is mounted on a front lower portion of the vehicle-use meter. By mounting the manipulation switch on the front lower portion of the vehicle-use meter, without enlarging a profile of the vehicle-use meter, the manipulation switch can be located at a position away from the vehicle-use meter. Due to such a structure, the vehicle-use meter is more versatile because, for example, the same vehicle-use meter can be used for plural kinds of motorcycles.

According to another embodiment of the present invention, a surface treatment as same as a surface treatment applied to the meter cover is applied to a manipulation button of the manipulation switch. Accordingly, it is possible to allow the manipulation button to be observed integrally with the meter cover. As a result, an aesthetic property of the motorcycle is enhanced.

According to another embodiment of the present invention, a display portion of the vehicle-use meter which displays vehicle information is formed in an approximately rectangular shape. The display portion is covered with a transparent cover and can be observed through the transparent cover. The transparent cover can be directly observed through an opening formed in the meter cover. For example, if the vehicle-use meter can be arranged as close as possible to the surface of the meter cover, a rider can easily observe the vehicle-use meter and hence, such an arrangement is desirable.

Accordingly, by forming the display portion of the vehicle-use meter which displays vehicle information into approximately rectangular shape, by covering the display portion with the transparent cover which allows the viewing of the display portion therethrough, and by allowing the transparent cover to be directly observed through the opening of the meter cover, it is possible to arrange the vehicle-use meter close to a surface of the meter cover (at a coplanar position). As a result, the visibility of the vehicle-use meter is enhanced.

According to another embodiment of the present invention, the transparent cover is formed into a spherical lens capable of displaying the display portion in an enlarged manner. Accordingly, visibility of the vehicle-use meter is further enhanced because it is possible for a rider to observe the display portion in an enlarged manner.

BRIEF DESCRIPTION OF THE DRAWINGS

A preferred embodiment of the present invention will be described with reference to the accompanying drawings, wherein.

DETAILED DESCRIPTION OF THE INVENTION

A preferred embodiment of the present invention will be described below with reference to the drawings. It is to be noted that the drawings are to be viewed in the direction of symbols.

Figure 1:
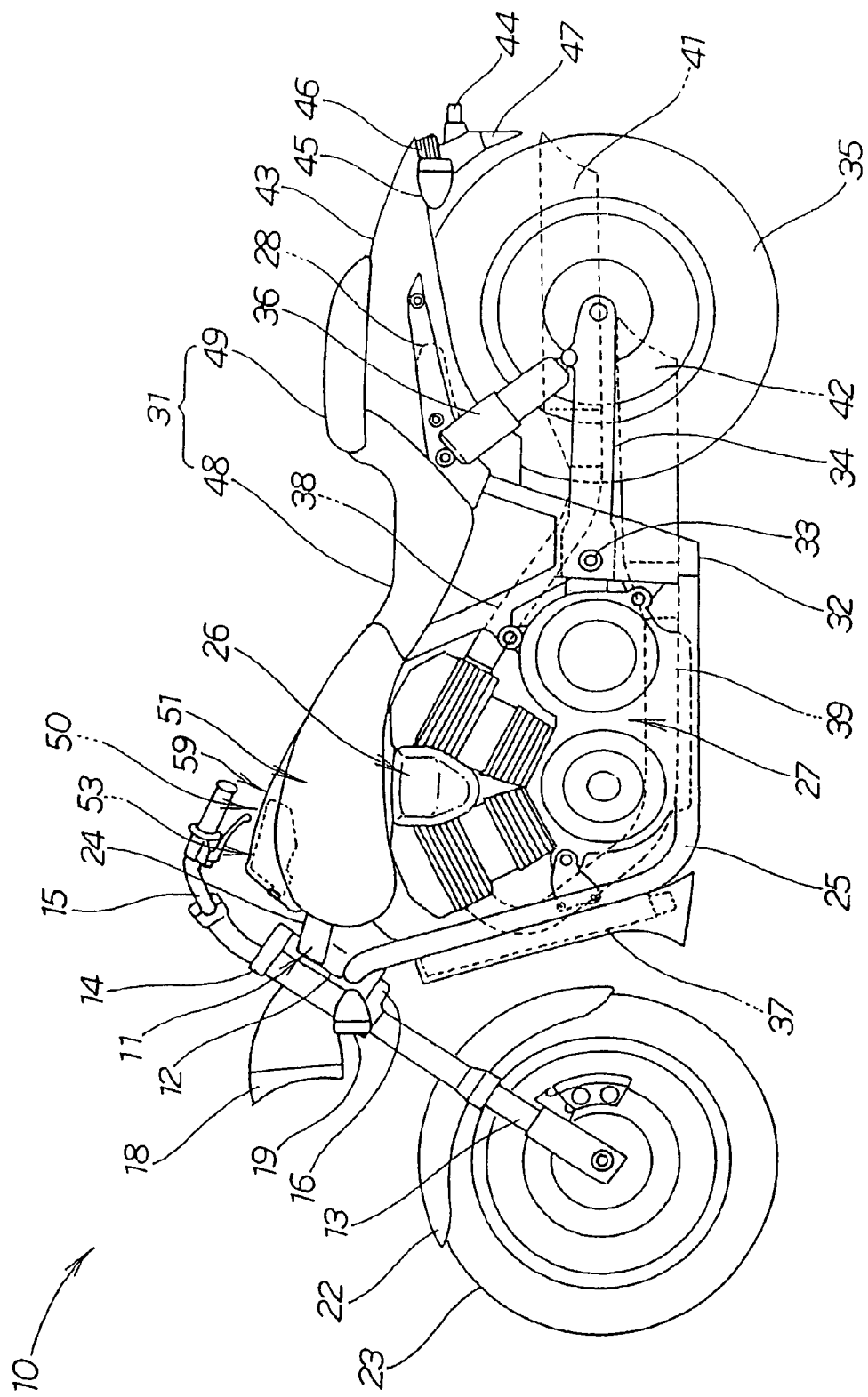
FIG. 1 illustrates a side view of a motorcycle which adopts an instrument panel according to the present invention.

FIG. 1 is a side view of the motorcycle which includes an instrument panel according to the present invention. The motorcycle 10 is shown as follows. A head pipe 12 is mounted on a vehicle body frame 11, a front fork 13 is mounted on the head pipe 12 in a steerable manner, and a steering handle 15 is mounted on a top bridge 14 of the front fork 13. A head light 18 and left and right front blinkers 19 (right blinker 19 being not shown in FIG. 1) are arranged at a front position between the top bridge 14 and a bottom bridge 16, a front fender 22 and a front wheel 23 are mounted on a lower portion of the front fork 13, and a main frame 24 of the vehicle body frame 11 is extended rearward from the head pipe 12 and a down tube 25 of the vehicle body frame 11 is extended rearward from an oblique lower position. An engine 26 is arranged between the main frame 24 and the down tube 25, a transmission 27 is connected to the engine 26, and a fuel tank 51 is mounted on the main frame 24. A seat rail 28 is extended rearward from the main frame 24, a seat (a tandem seat) 31 is mounted on the seat rail 28, and a sub frame 32 is extended from the down tube 25 to the seat rail 28. A rear swing arm 34 is extended from a rear lower portion of the vehicle body frame 11 by way of a pivot 33, a rear wheel 35 is mounted on a rear end of the rear swing arm 34 in a rotatable manner, and a rear cushion 36 is extended between the rear portion of the rear swing arm 34 and the vehicle body frame 11. Here, numerals 38 and 39 indicate exhaust pipes which extend from the engine 26.

In the drawing, numeral 37 indicates a radiator, numerals 41, 42 indicate mufflers which are respectively connected to the exhaust pipes 38, 39, numeral 43 indicates a rear fender, numeral 44 indicates a license lamp, numeral 45 indicates a rear blinker, numeral 46 indicates a tail lamp, and numeral 47 indicates a mud splash guard (a mudguard).

The tandem seat 31 is constituted of a rider's seat 48 on which a rider sits and a pillion 49 on which a pillion passenger sits, wherein the pillion 49 is arranged one stage (step) higher than the rider's seat 48.

Numeral 50 indicates an instrument panel of the motorcycle according to the present invention. The instrument panel of the motorcycle 50 is explained in detail hereinafter.

Figure 2:
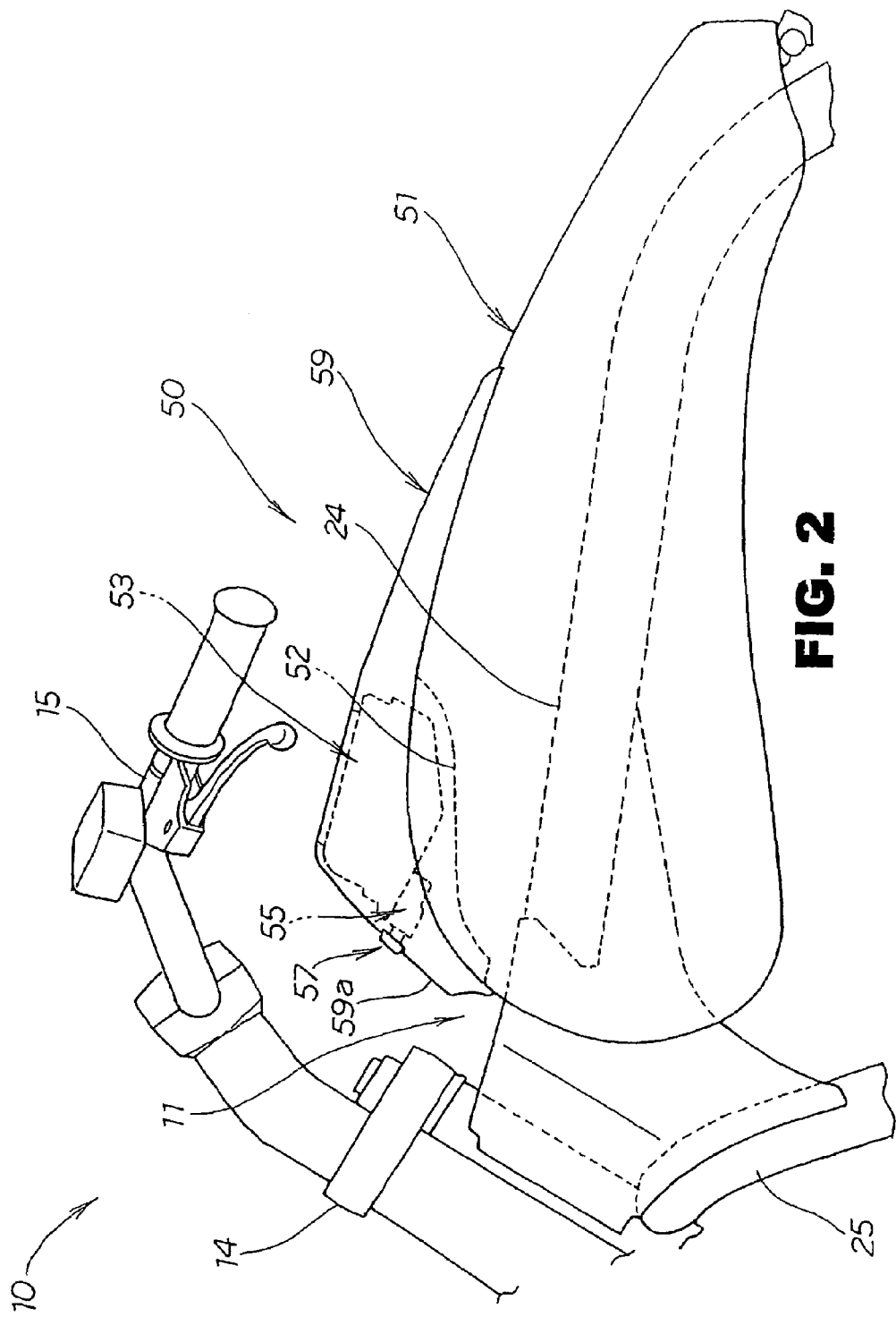
FIG. 2 illustrates a side view of the instrument panel of the motorcycle according to the present invention.

FIG. 2 is a side view of the instrument panel of the motorcycle according to the present invention. The instrument panel of the motorcycle 50 is shown as follows. A recessed portion 52 is formed in an upper portion of the fuel tank 51, a vehicle-use meter 53 is located in the recessed portion 52, the surrounding of the vehicle-use meter 53 is covered with a meter cover 59, and manipulation switches 57, 58 which manipulate the vehicle-use meter 53, are arranged on a front side wall (a front portion of a side wall) 59a of the meter cover 59. For example, when the manipulation switches 57, 58 are arranged on an upper surface of the meter cover 59, a possibility exists that the rider may drop an article or carelessly touches these switches. Accordingly, by arranging the manipulation switches 57, 58 on a front side wall (a front portion of a side wall) 59a of the meter cover 59, it is possible to prevent or reduce the likelihood of the rider carelessly touching the manipulation switches 57, 58.

Figure 3:
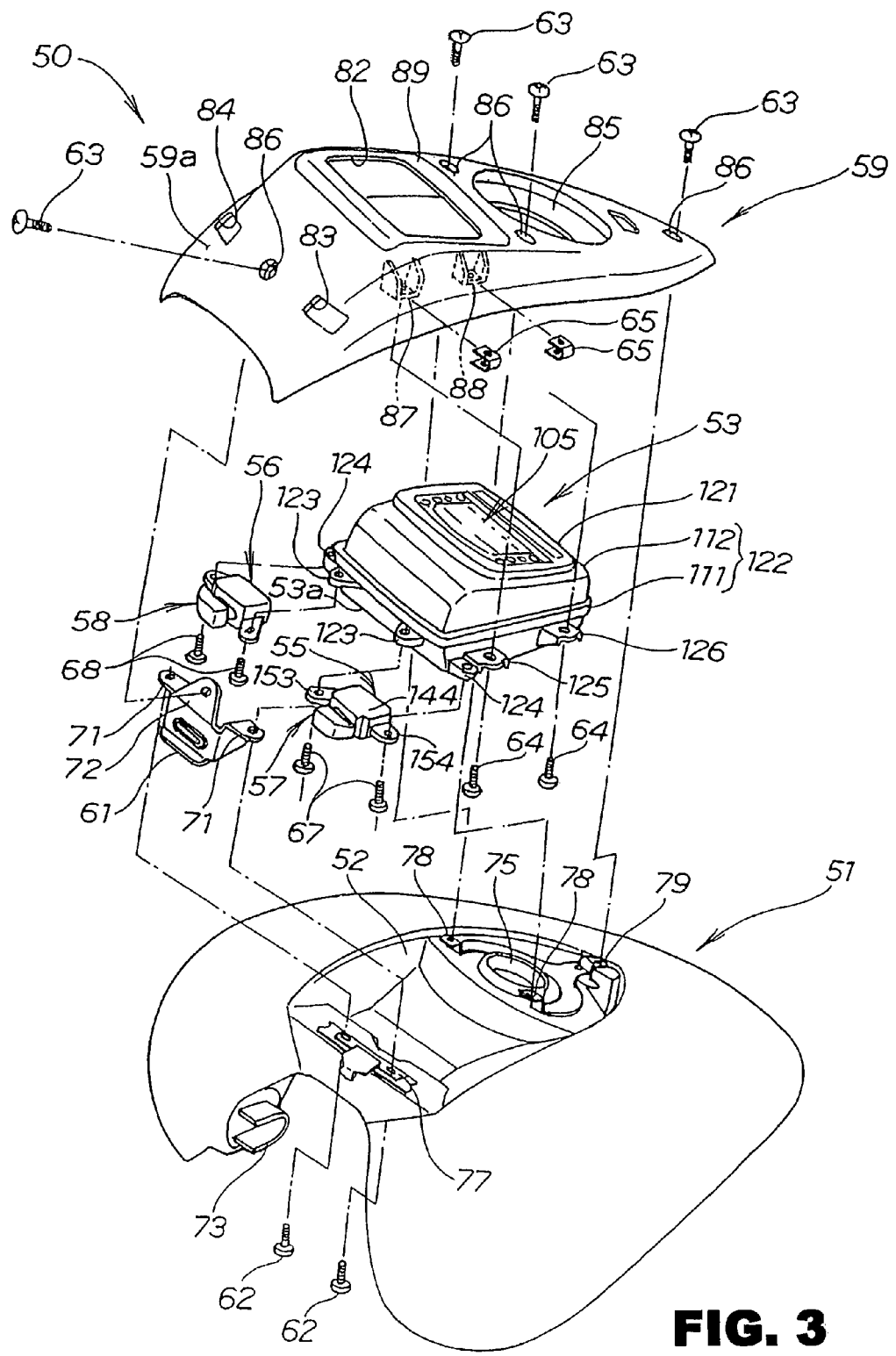
FIG. 3 illustrates an exploded perspective view of the instrument panel of the motorcycle according to the present invention.

FIG. 3 is an exploded perspective view of the instrument panel of the motorcycle according to the present invention. The instrument panel of the motorcycle 50 is made up of the fuel tank 51 which stores fuel, the recessed portion 52 which is formed in the upper front portion of the fuel tank 51, the vehicle-use meter 53 which corresponds with the recessed portion 52, a left manipulation switch 55 that is attached with a left side of a front lower portion 53a of the vehicle-use meter 53, a left manipulation button 57 that is attached with the manipulation switch 55, a right manipulation button 56 that is attached with a right side of a front lower portion 53a of the vehicle-use meter 53, a right manipulation button 58 that is attached with the manipulation switch 56, and the meter cover 59 which allows the right and left manipulation buttons 57, 58 and a display portion 105 of the vehicle-use meter 53 to be observed therethrough and, at the same time, covers the right and left switches 55, 56 and a housing portion 122 of the vehicle-use meter 53 collectively.

A mounting bracket 61 is attached with the fuel tank 51 for allowing the mounting of a front portion of the meter cover 59, wherein the mounting bracket 61 includes mounting flanges 71, 71 for attaching the fuel tank 51 with a cover mounting portion 72 for mounting the meter cover 59.

Further, mounting screws 62 attach (e.g., mount) the mounting bracket 61 with the fuel tank 51. Mounting screws 63 attach the meter cover 59 with the fuel tank 51. Mounting screws 64 attach the vehicle-use meter 53 with the meter cover 59 by way of a U-shaped blanked nut 65. Mounting screws 67 attach a left manipulation switch 55 with a front lower portion 53a of the vehicle-use meter 53. Mounting screws 68 attach a right manipulation switch 56 with the front lower portion 53a of the vehicle-use meter 53.

Figure 4:
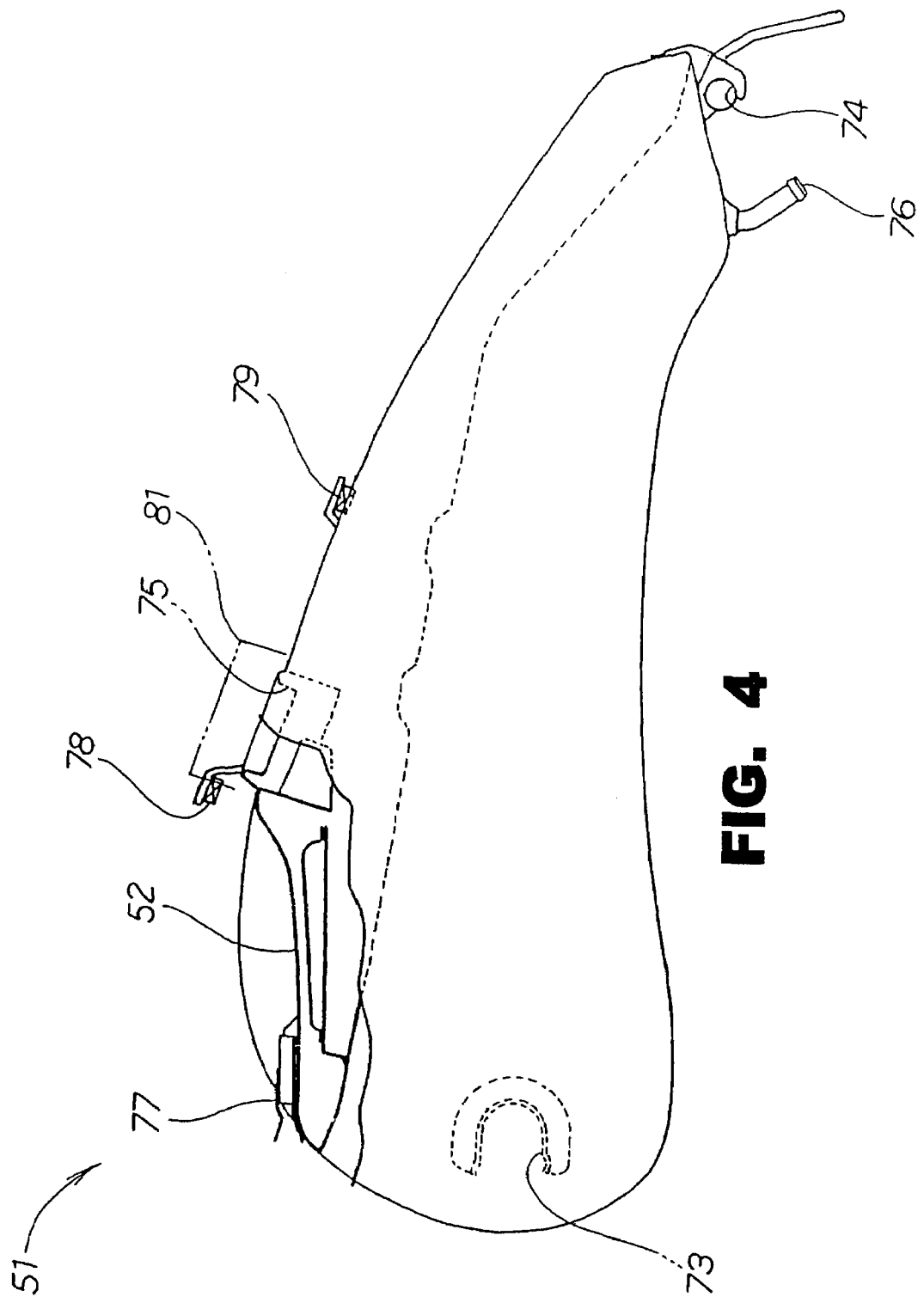
FIG. 4 illustrates a side view of a fuel tank of the instrument panel of the motorcycle according to the present invention.

FIG. 4 is a side view of the fuel tank of the instrument panel of the motorcycle according to the present invention, wherein the fuel tank 51 is a member which is made up of a recessed portion 52 which corresponds with the vehicle-use meter 53, front engaging portions 73, 73 (the front engaging portion 73 on deep side being omitted) which are formed on left and right sides of a front portion of the fuel tank 51 to be engaged with the vehicle body frame 11 (see FIG. 1) side, a rear engaging portion 74 which is formed on a rear portion of the fuel tank 51 to be engaged with the vehicle body frame 11 side, a fuel supply port 75 which supplies fuel, a drain discharge port 76 which discharges water dwelled in the inside of the fuel tank 51, a front mounting portion 77 which allows the mounting of the front portion of the meter cover 59 thereon by way of the mounting bracket 61, center mounting portions 78, 78 (one center mounting portion 78 not shown in the drawing) which allow the mounting of the center portion of the meter cover 59 thereon, and a rear mounting portion 79 which mounts a rear portion of the meter cover 59.

Fuel cap 81 is mounted in the fuel supply port 75.

Figure 5:
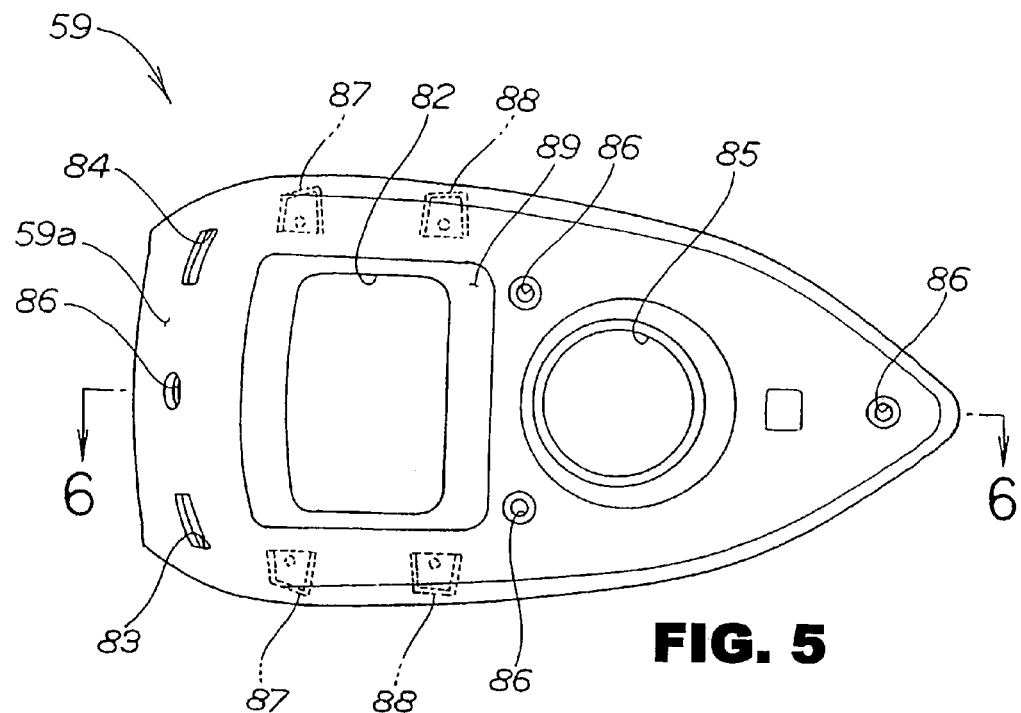
FIG. 5 illustrates a plan view of a meter cover of the instrument panel of the motorcycle according to the present invention.

FIG. 5 is a plan view of the meter cover of the instrument panel of the motorcycle according to the present invention.

The meter cover 59 is a member having a surface to which chromium plating is applied. The meter cover 59 is made up of an opening 82 which allows the display part 105 to be observed therethrough, a button opening 83 which is formed in a left side of a front-side surface (a front side wall) 59a for allowing the left manipulation button 57 to pass therethrough, a button opening 84 which is formed in a right side of the front-side surface (the front side wall) 59a for allowing the right manipulation button 58 to pass therethrough, a cap opening 85 which allows a fuel cap 81 of the fuel tank 51 (see FIG. 4) to pass therethrough, stopper holes 86 . . . (. . . indicating plural number, the definition used hereinafter in the same manner) which allow the screwing of the meter cover 59 to the fuel tank 51 side, front mounting portions 87, 87 (one front mounting portion 87 not shown) which mounts the vehicle-use meter 53 thereon by way of the blanked nuts 65, 65 (one sheet-metal nut 65 not shown), and rear mounting portions 88, 88 (one rear mounting portion 88 not shown) which mounts the vehicle-use meter 53 thereon by way of the sheet-metal nuts 65, 65 (one sheet-metal nut 65 not shown). A frame portion 89 surrounds the periphery of the opening 82 and allows the display part 105 to be observed therethrough (see FIG. 3).

Figure 6:
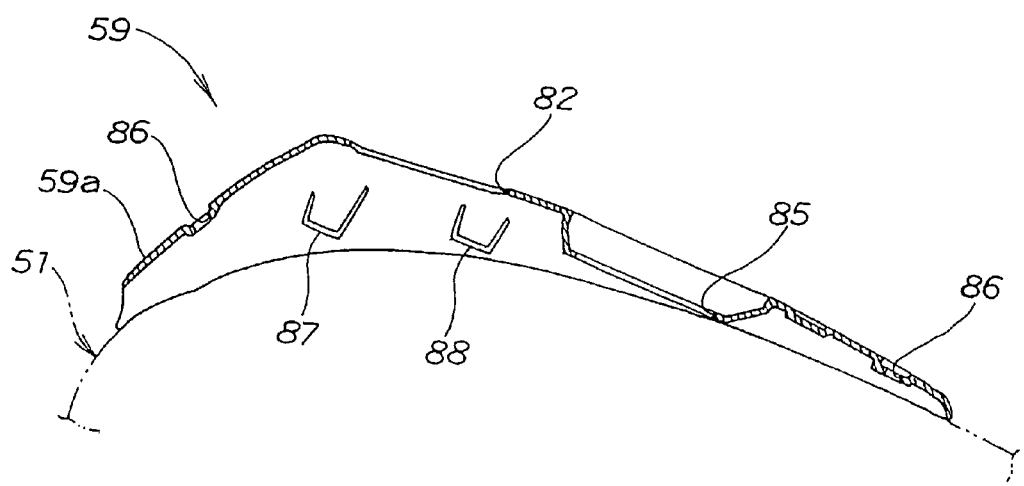
FIG. 6 illustrates a cross-sectional view taken along a line 6-6 in FIG. 5.

FIG. 6 is a cross-sectional view taken along a line 6-6 in FIG. 5, wherein meter cover 59 is a member which allows the left and right manipulation buttons 57, 58 and the display part 105 of the vehicle-use meter 53 (see FIG. 3) to be observed therethrough and, at the same time, allows the fuel cap 81 (see FIG. 4) to be observed therethrough. As explained in conjunction with FIG. 3, the meter cover 59 may be referred to as a member which collectively covers the left and right manipulation switches 55, 56 and the housing 122 (see FIG. 3) portion of the vehicle-use meter 53 and, at the same time, covers a front portion of an upper surface of the fuel tank 51.

Figure 7:
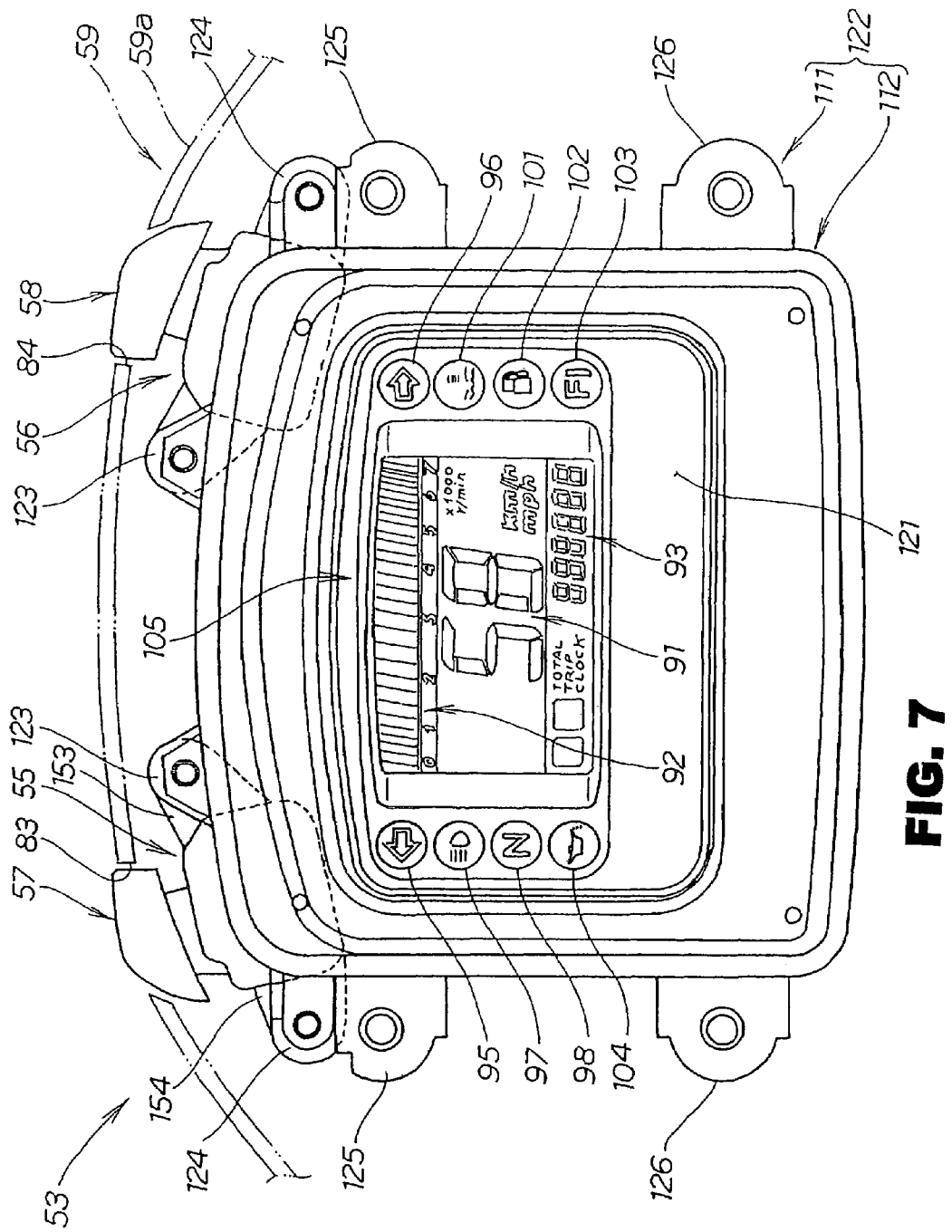
FIG. 7 illustrates a plan view showing a state in which a manipulation switch is assembled into a vehicle-use meter of the instrument panel of the motorcycle according to the present invention.

FIG. 7 is a plan view showing a state in which the manipulation switch is assembled to the vehicle-use meter of the instrument panel of the motorcycle according to the present invention. The vehicle-use meter 53 includes, for example, the display part 105, wherein the display part 105 is constituted of a speed meter 91 which displays a vehicle speed, a tachometer 92 which displays a rotational speed of the engine, a numerical value portion 93 which performs an odometer display which displays an integrated traveled distance, a first trip display (a trip A display) which is a display of a given traveled distance, a second trip display (a trip B display) which is a display of a given traveled distance and a clock display, left and right direction indicator display lamps 95, 96 which display turning directions, an upper-direction (high-beam) display lamp 97 which displays the upper direction of the head light 18 (see FIG. 1), a neutral display lamp 98 which displays that the transmission 27 shown in FIG. 1 is in a neutral position, a water temperature alarm lamp 101 which informs the temperature elevation of cooling water, a fuel alarm lamp 102 which informs the decrease of fuel, a FI (fuel injection) alarm lamp 103 which informs an abnormal condition of a fuel injection device (not shown in the drawing), and an oil pressure alarm lamp 104 which informs an abnormal condition of the oil pressure.

The left manipulation switch 55 is a mode switch, wherein the mode switch is a switch which is capable of changing over a display mode among the odometer display which displays the integrated traveled distance, the first trip display (the trip A display) which is the display of the given traveled distance, the second trip display (the trip B display) which is a display of the given traveled distance and the clock display. Further, the left manipulation switch 55 is mounted on a left inner mounting portion 123 and a left outer mounting portion 124 which are formed on the front lower portion 53a (see FIG. 3) of the vehicle-use meter 53 (the lower housing 111) of the housing 122 (the lower housing 111).

The right manipulation switch 56 is a reset switch, wherein the reset switch is a switch which resets the first trip display and the second trip display. Further, the right manipulation switch 56 is attached with a right inner mounting portion 123 and a right outer mounting portion 124 which are formed on the front lower portion 53a (see FIG. 3) of the vehicle-use meter 53.

Further, a front stay portion 125 which is formed on a lower housing 111 to be attached with the front mounting portion 87 of the meter cover 59, and a rear stay portion 126 which is attached with a lower housing 111 to be attached with a rear mounting portion 87 of the meter cover 59.

Next, the structure of the vehicle-use meter 53 is described.

Figure 8:
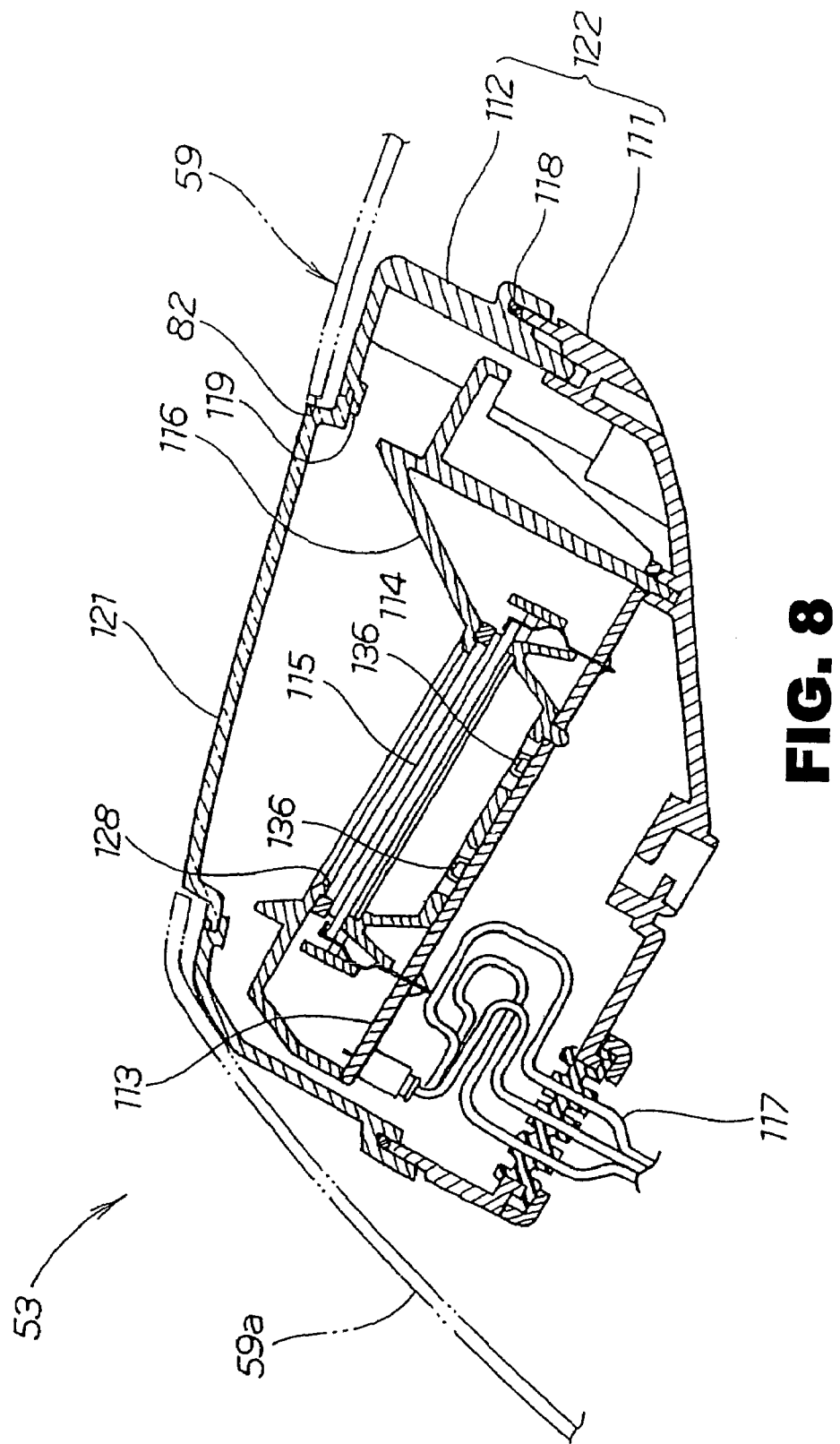
FIG. 8 illustrates a longitudinal cross-sectional view of the instrument panel of the motorcycle according to the present invention.

FIG. 8 is a longitudinal cross-sectional view of the instrument panel of the motorcycle according to the present invention, wherein the vehicle-use meter 53 is made up of the lower housing 111, a control printed circuit board 113 which is attached with the lower housing 111, a liquid crystal illumination holder 114 which is attached with the control printed circuit board 113, a color liquid crystal 115 which is attached with the liquid crystal illumination holder 114 and is wired to the control printed circuit board 113, a partition panel 116 which is provided to cover the color liquid crystal 115, display lamps 95 to 98 (see FIG. 7) and alarm lamps 101 to 104, a harness 117 which is connected with the control printed circuit board 113 and, at the same time, extends from the lower housing 111, an upper housing 112 which is provided to cover the lower housing 111 by way of a seal ring 118, and a transparent cover 121 which is mounted on a housing opening portion 119 of the upper housing 112. Here, a housing 122 adopts the two-split constitution consisting of the lower housing 111 and the upper housing 112.

Figure 9:
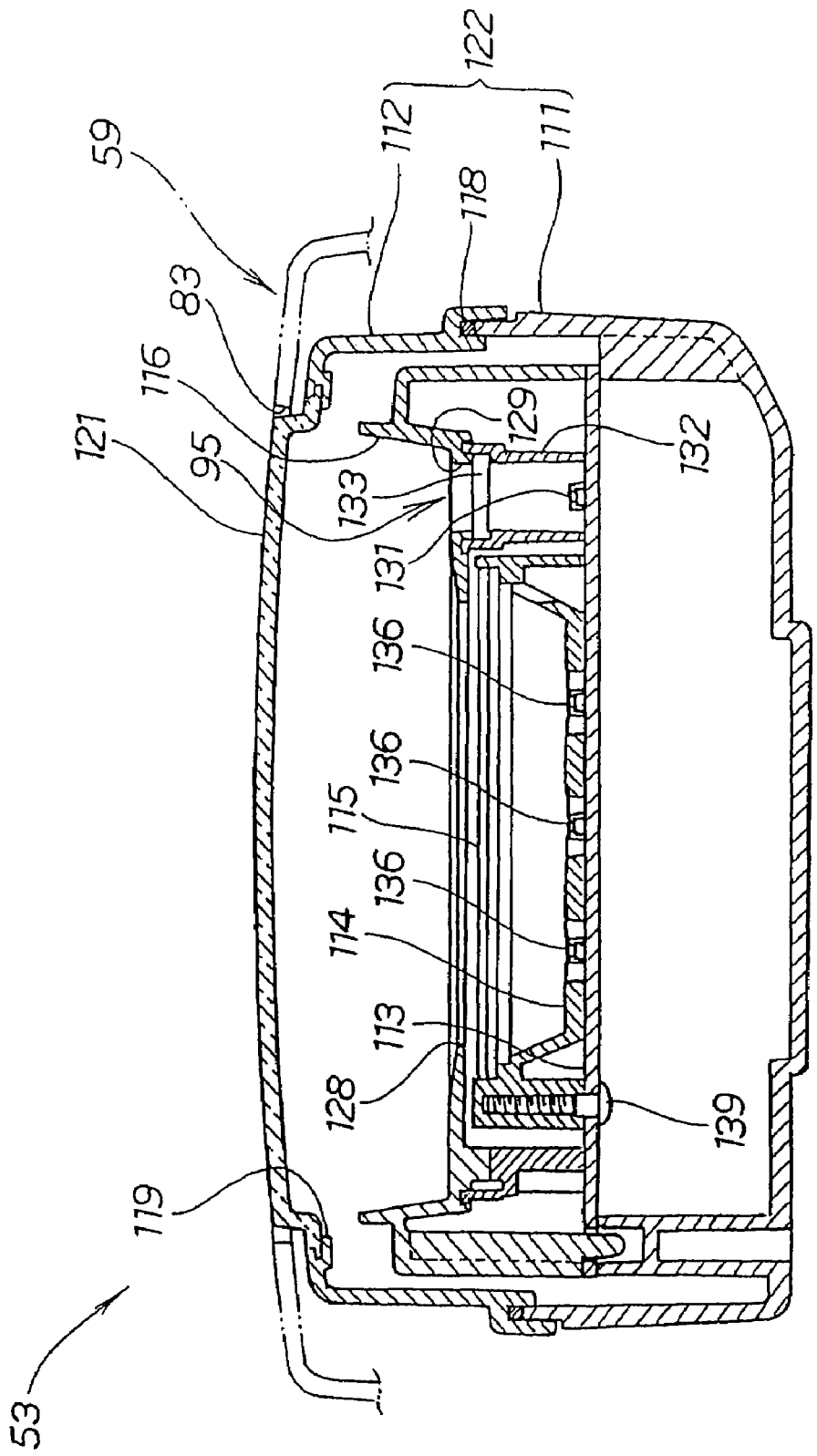
FIG. 9 illustrates a transverse cross-sectional view of the instrument panel of the motorcycle according to the present invention.

FIG. 9 is a transverse cross-sectional view of the instrument panel of the motorcycle according to the present invention, wherein the partition panel 116 includes a liquid crystal opening portion 128 which allows the color liquid crystal 115 to be observed therethrough and display openings 129 . . . (showing only one display opening 129) which allow the display lamps 95 to 98 and the alarm lamps 101 to 104 to be observed therethrough.

The left direction indicator display lamp 95 is configured such that a lighting LED 131 is mounted on the control printed circuit board 113, an LED (light emitting diode) holder 132 is mounted on the control printed circuit board 113 to shield the periphery of the lighting LED 131 from light, a mark display plate 133 is mounted on an upper end of the LED holder 132, and the mark display plate 133 is allowed to be observed through the display opening 129 of the partition panel 116.

Here, the display lamps 96 to 98 (see FIG. 7) and the alarm lamps 101 to 104 have the same constitution as the display lamp 95 and hence, the detailed explanation of these lamps is omitted.

The control printed circuit board 113 includes a control element (not shown in the drawing) which controls the display part 105, a liquid crystal illumination LED 136 . . . for illuminating the color liquid crystal 115 from the back, the lighting LED 131 . . . which turns on the display lamps 95 to 98 and the alarm lamps 101 to 104. Further, the liquid crystal illumination holder 114 is mounted on the control printed circuit board 113 using, for example, mounting screws 139.

The transparent cover 121 is formed into a spherical lens which is capable of displaying the display part 105 (see FIG. 7) in an enlarged manner. In this case, the display part 105 can be observed in an enlarged manner.

Figure 10:
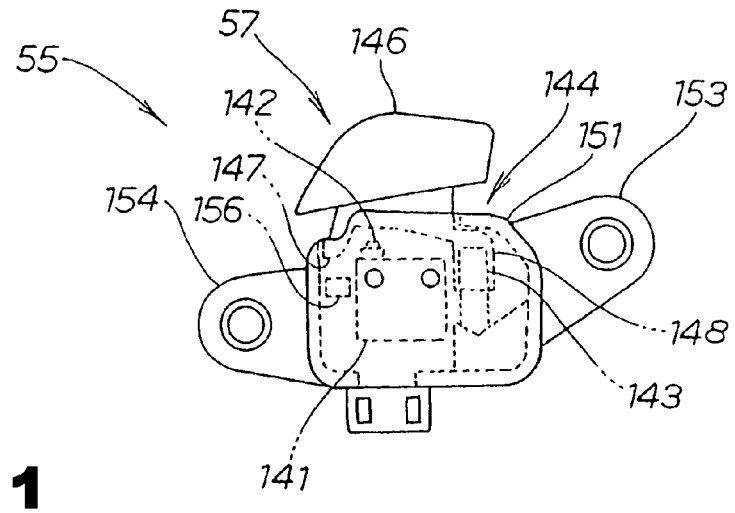
FIG. 10 illustrates a plan view of a manipulation switch of the instrument panel of the motorcycle according to the present invention.
Figure 11:
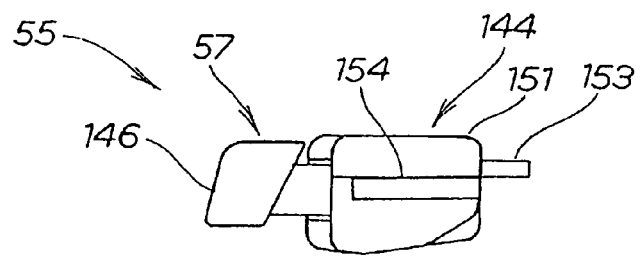
FIG. 11 illustrates a side view of the manipulation switch of the instrument panel of the motorcycle according to the present invention.

FIG. 10 is a plan view of the manipulation switch of the instrument panel of the motorcycle according to the present invention. FIG. 11 is a side view of the manipulation switch of the instrument panel of the motorcycle according to the present invention.

The left manipulation switch 55 includes a switch body 141, the manipulation button 57 which presses a manipulation portion 142 of the switch body 141, a restoring spring 143 which returns the manipulation button 57 to an initial state, and a switch casing 144 which collectively accommodates the switch body 141, a portion of the manipulation button 57 and a restoring spring 143.

The right manipulation switch 56 (see FIG. 7) is a member which has a left-and-right symmetrical shape with respect to the left manipulation switch 57 and hence, the detailed explanation of the right manipulation switch 56 is omitted.

Figure 12:
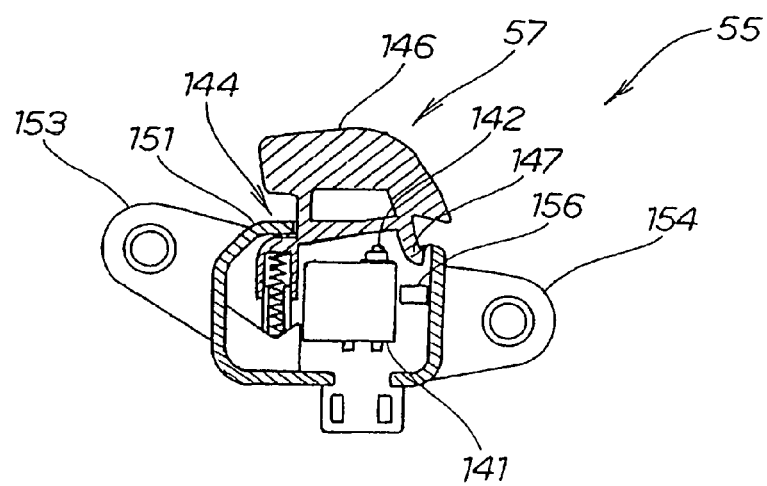
FIG. 12 illustrates a bottom plan view of the manipulation switch of the instrument panel of the motorcycle according to the present invention.

FIG. 12 is a bottom plan view of the manipulation switch of the instrument panel of the motorcycle according to the present invention, wherein the left manipulation button 57 is formed of resin and, in the same manner as the meter cover 59 (see FIG. 6), includes a button portion 146 having a surface to which chromium plating is applied, a projecting portion 147 which extends from one side of the button portion 146 and is brought into contact with a stopper 156 of the switch casing 144, and a spring fitting portion 148 which extends from another side of the button portion 146 and is fitted on the restoring spring 143.

The right manipulation button 58 (see FIG. 7) has a left-and-right symmetrical shape with respect to the left manipulation button 57 and hence, the detailed explanation of the right manipulation button 58 is omitted.

The switch casing 144 is made up of a casing accommodating portion 151 which accommodates the switch body 141, an inner flange portion 153 which is mounted on the inner mounting portion 123 of the lower housing 111, and an outer flange portion 154 which is mounted on the outer mounting portion 124 of the lower housing 111.

Further, the casing accommodating portion 151 includes a spring support portion 155 which supports the restoring spring 143 and a stopper 156 which receives the projecting portion 147 of the manipulation button 57.

Figure 13:
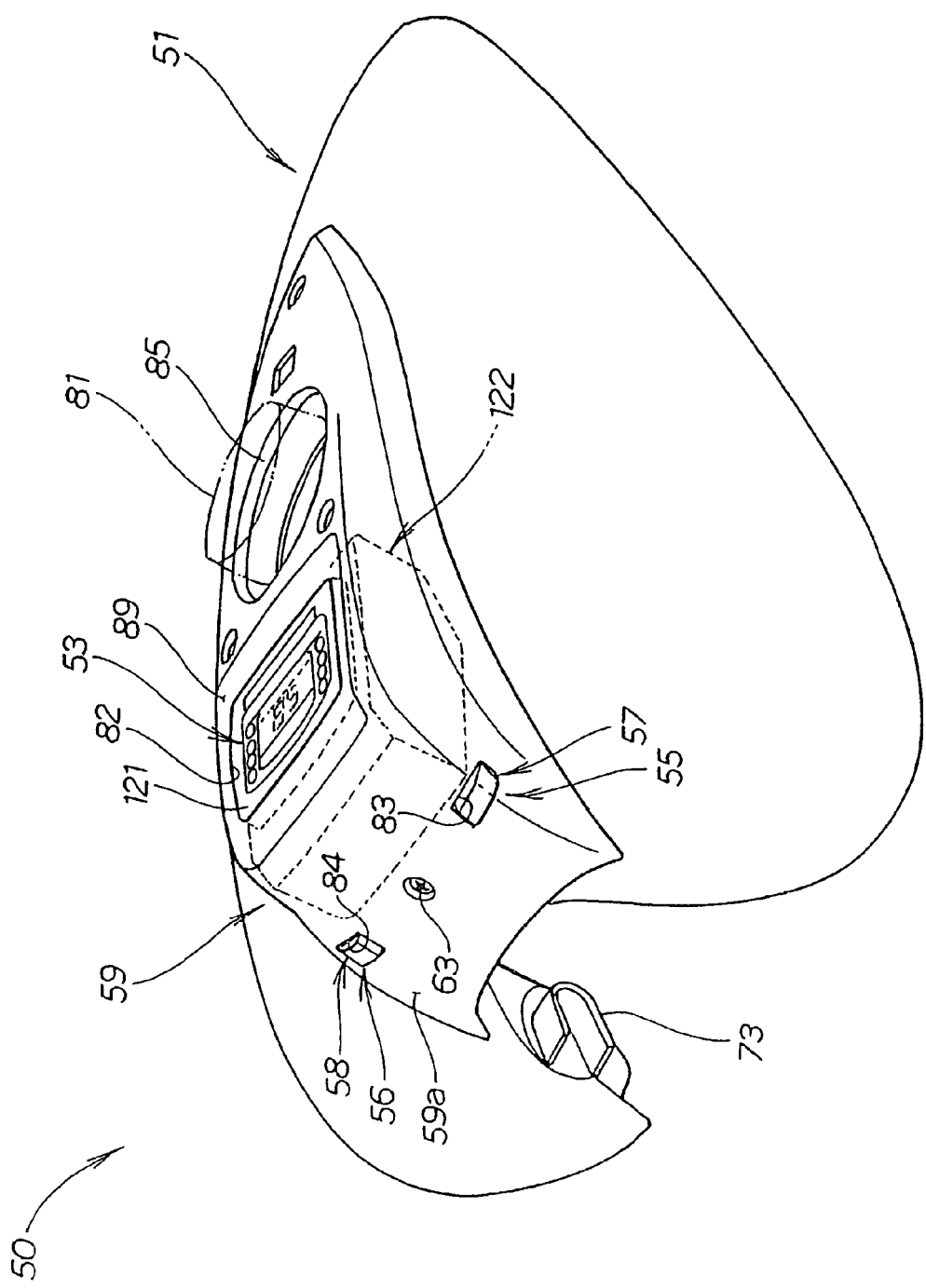
FIG. 13 illustrates a perspective view of the instrument panel of the motorcycle according to the present invention.

FIG. 13 is a perspective view of the instrument panel of the motorcycle according to the present invention. Here, the motorcycle 10 which arranges the vehicle-use meter 53 on the upper portion of the fuel tank 51 and covers the periphery of the vehicle-use meter 53 with the meter cover 59 (see FIG. 1), the left and right manipulation switches 55, 56 which manipulate the vehicle-use meter 53 are arranged on the front-end side wall 59a (side surface) of the meter cover 59.

By arranging the manipulation switches 55, 56 which manipulate the vehicle-use meter 53 on the front-end side wall 59a (side surface) of the meter cover 59, it is possible to prevent a rider from carelessly touching the left and right manipulation switches 55, 56. As a result, it is possible to obviate the erroneous operation of the left and right manipulation switches 55, 56.

Figure 14:
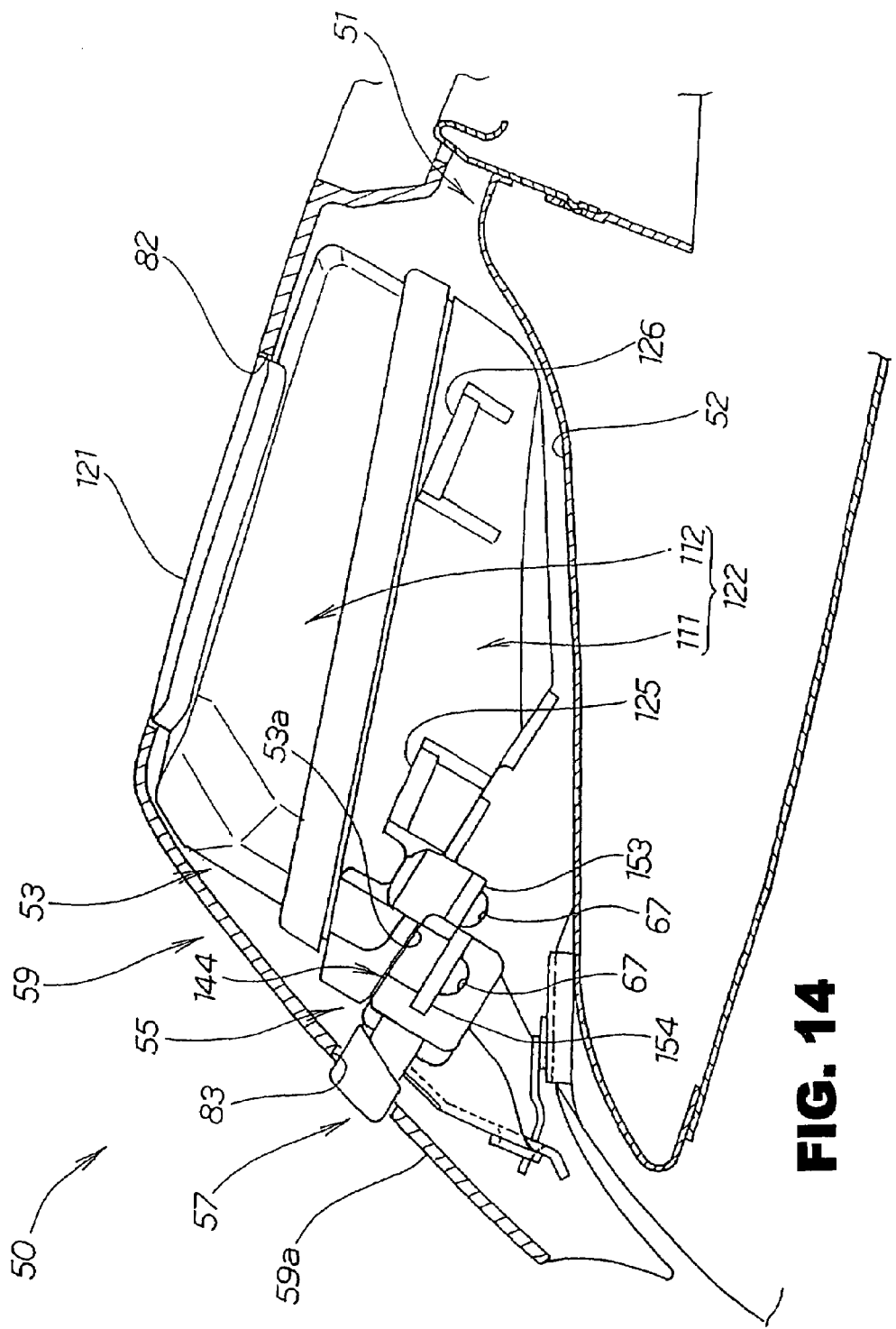
FIG. 14 illustrates a cross-sectional view of the surrounding of the vehicle-use meter and the manipulation switch of the instrument panel of the motorcycle according to the present invention.

FIG. 14 is a cross-sectional view of the surrounding of the vehicle-use meter of the instrument panel and the manipulation switches of the motorcycle according to the present invention. Here, the manipulation switches 55, 56 (the manipulation switch 56 is not shown in the drawing) are mounted on the front lower portion 53a of the vehicle-use meter 53.

By mounting the manipulation switches 55, 56 (see FIG. 7 with respect to the manipulation switch 56) on the front lower portion 53a of the vehicle-use meter 53, it is possible to arrange the manipulation switches 55, 56 at positions remote from the vehicle-use meter 53 without increasing a profile of the vehicle-use meter 53. Accordingly, it is possible to use the same vehicle-use meter 53 in various kinds of motorcycles. As a result, it is possible to enlarge the versatility of the vehicle-use meter 53.

The surface treatment (chromium plating) equal to the surface treatment applied to the meter cover 59 is applied to the manipulation buttons 57, 58 (see FIG. 7 with respect to the manipulation button 58) of the manipulation switches 55, 56.

By applying the same surface treatment as the surface treatment applied to the meter cover 59 to the manipulation buttons 57, 58 (see FIG. 7 with respect to the manipulation button 58) of the manipulation switches 55, 56, it is possible to exhibit the manipulation buttons 57, 58 integrally with the meter cover 59. As a result, it is possible to enhance the design property of the motorcycle 10 (see FIG. 1).

The vehicle-use meter 53 is configured such that the display part 105 (see FIG. 7) which displays the vehicle information is formed in an approximately rectangular shape, the display part 105 is covered with the transparent cover 121 which allows the display part 105 to be observed through the transparent cover 121, and the transparent cover 121 is directly observed through the opening 82 formed in the meter cover 59.

By forming the vehicle-use meter 53 such that the display part 105 (see FIG. 7) which displays the vehicle information is formed in an approximately rectangular shape, the display part 105 is covered with the transparent cover 121 which allows the display part 105 to be observed through the transparent cover 121, and the transparent cover 121 is directly observed through the opening 82 formed in the meter cover 59, it is possible to position the vehicle-use meter 53 close to (at a coplanar position with) the surface of the meter cover 59. As a result, it is possible to enhance the visibility of the vehicle-use meter 53.

The transparent cover 121 is formed into the spherical lens capable of displaying the display part 105 (see FIG. 7) in an enlarged manner. By forming the transparent cover 121 in the spherical lens capable of displaying the display part 105 (see FIG. 7) in an enlarged manner, the rider can observe the display part 105 in an enlarged manner. As a result, the visibility of the vehicle-use meter 53 can be further enhanced.

Here, in the instrument panel of the motorcycle according to the present invention, as shown in FIG. 5 and FIG. 12, the chromium plating is applied to the surfaces of the meter cover 59 and the left and right manipulation buttons 57, 58. However, the present invention is not limited such a case and, for example, the nickel plating or coating may be applied to the above-mentioned surfaces or the same surface treatment may be applied to the meter cover and the left and right manipulation buttons.

In FIG. 12, the manipulation buttons 57, 58 are assembled into the manipulation switches 55, 56. However, the present invention is not limited to such a constitution, and the manipulation switches are arranged independently from the manipulation buttons 57, 58 and the manipulation switches are manipulated by separately arranged manipulation buttons. Also, in FIG. 12, the manipulation switches 55, 56 are arranged on the front-end side walls 59a of the meter cover 59. However, the present invention is not limited to such an arrangement either, and the manipulation switches may be arranged on the side surfaces (including left and right side surfaces) of the meter cover. Also, in FIG. 12, two manipulation switches 55, 56 are shown arranged on the meter cover 59. However, the present invention is not limited to such an arrangement and one or three or more manipulation switches may be arranged on the meter cover 59.

The instrument panel of the motorcycle according to the present invention is preferably adopted by the motorcycle having a large exhaust quantity which mounts a multi-cylinder engine.

The configuration of the embodiment is just an example. As a matter of course, various changes or modifications may be made unless they depart from the spirit of the invention.

We claim:

1. An instrument panel of a motorcycle, comprising:
    a vehicle-use meter provided on an upper portion of a fuel tank;
    a meter cover that covers said vehicle-use meter; and
    a manipulation switch,
    wherein said vehicle-use meter comprises an upper housing and a lower housing,
    wherein said manipulation switch communicates with said vehicle-use meter and is mounted on said lower housing of said vehicle-use meter, and
    wherein said vehicle-use meter has a front portion facing away from a motorcycle rider and said manipulation switch is attached to a lower portion of said front portion of said vehicle-use meter.

2. The instrument panel of a motorcycle according to claim 1, wherein a surface treatment as same as a surface treatment applied to said meter cover is applied to a manipulation button of said manipulation switch.

3. The instrument panel of a motorcycle according to claim 1, wherein said vehicle-use meter further comprises:
    a display portion that presents vehicle information, wherein the display portion is formed into an approximately rectangular shape and is covered with a transparent cover.

4. The instrument panel of a motorcycle according to claim 3, wherein said transparent cover is formed into a spherical lens capable of presenting the display portion in an enlarged manner.

5. The instrument panel of a motorcycle according to claim 1, wherein said vehicle-use meter is attached to said meter cover and said manipulation switch extends through an aperture provided in said meter cover.

* * * * *